UNITED STATES PATENT OFFICE.

ALFRED PARAF, OF NEW YORK, N. Y., ASSIGNOR TO THE MADDER COLOR COMPANY, OF SAME PLACE.

IMPROVEMENT IN COMPOSITIONS OF MADDER FOR DYEING.

Specification forming part of Letters Patent No. 120,392, dated October 31, 1871.

*To all whom it may concern:*

Be it known that I, ALFRED PARAF, of France, now residing in the city, county, and State of New York, have made an invention of a new and useful article of manufacture which I denominate Alizaride, and that the following is a full, clear, and exact description and specification of the same.

Alizaride is a compound of the coloring matter of madder with a neutral alkali and with ammonia, and it may be prepared in the following manner: Mix together ten pounds (avoirdupois) of the extract of madder in the condition of paste, in which it is found in commerce, with half a pound (avoirdupois) of finely-ground carbonate of potash; mix the two together thoroughly by grinding them or stirring them, and permit the mixture to rest until the carbonate of potash is absorbed by the madder extract, which generally requires about an hour; then stir into the above compound a weak solution of ammonia, consisting of two gallons of water containing one pound (apothecaries' weight) ordinary aqua ammonia of commerce; heat the mixture slightly—say to a temperature of about 150° Fahrenheit—until the entire mass becomes liquid, taking care not to raise it to a boiling heat.

The compound thus produced is the article denominated alizaride, and is suitable for dyeing and printing madder colors, and particularly for the dyeing and printing of fibrous and textile articles of animal origin. It is particularly useful for the latter purpose, because the ammonia does not injure the fiber, and because the ammonia may be expelled from the article by heat, leaving a compound of the madder color with a neutral salt which does not injure the article that has been dyed or printed, and which is suitable for combining with the materials used as mordants.

The essential characteristic of my invention is that the madder color is compounded simultaneously with a volatile alkali, and with a neutral alkaline salt which is practically not volatilizable by the heat required in dyeing and printing operations; but the invention is not restricted to the particular method of preparation above described, nor to the particular neutral alkaline salt (carbonate of potash) above described, nor to the particular proportions of materials used.

I claim as my invention—

The new article of manufacture hereinbefore-described, and denominated alizaride.

Witness my hand this 12th day of September, A. D. 1871.

ALFRED PARAF.

Witnesses:
EMESTSLEYE,
C. G. EVANS.

(11)